Patented Apr. 24, 1928.

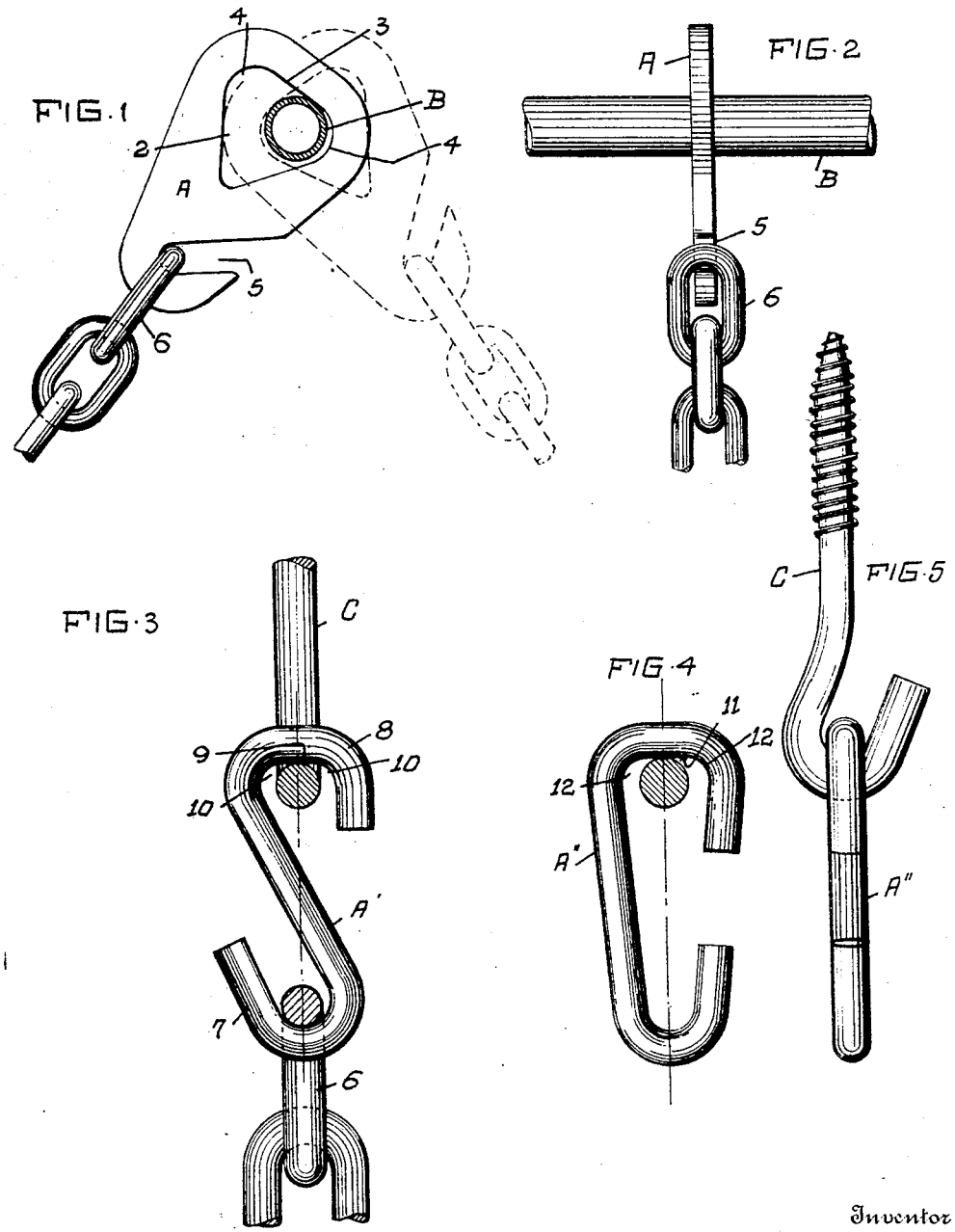

1,667,541

UNITED STATES PATENT OFFICE.

TOD S. EDEBURN, OF CLEVELAND, OHIO, ASSIGNOR TO ALFRED N. EDEBURN, OF CLEVELAND, OHIO.

COUPLING MEMBER OR LINK.

Application filed March 31, 1927. Serial No. 179,788.

My invention relates to an improvement in hammock hooks, chains, and the like, and in general my object is to provide a special link or coupling member for a flexible suspensory connection, such as a hammock chain, whereby a rocking connection may be effected and a swinging movement obtained with a minimum of friction and without squeak or noise at the point of connection.

In the accompanying drawing, Fig. 1 is a side view of a flat coupling member embodying my invention, and Fig. 2 is an edge view thereof. Fig. 3 is a side view of a hook member and Fig. 4 a link embodying the same invention. Fig. 5 is an edge view of the link shown in Fig. 3.

As a preliminary it should be understood that the links or hooks commonly used for hammocks, signs, swing seats, etc., embody arcuate bearing portions which permit a swinging movement but only with sliding and rubbing effect on and against the round surface or bearing part with which it coacts, thereby causing undue wear and objectionable noises unless the joint is suitably lubricated. Such articles are used outdoors and subjected to atmospheric changes and exposure, and the matter of lubrication is generally neglected or infrequently applied. The present device is designed to eliminate the need of lubrication and to provide a rocking connection for the swinging parts. This conception is exemplified clearly in Fig. 1 which shows a flat steel plate A having a triangular opening 2 adapted to sleeve loosely over a round pipe or bar B. The triangle is inverted and comprises a straight bearing edge 3 adapted to rock on the round outer surface of bar B. The width of the opening is such that the rocking movement of member A on bar B is limited. For all practical purposes the limit of rocking movement may be within an arc of ninety degrees. That is to say, member A may swing in an arc of ninety degrees and rock on straight edge 3 over the round surface of bar B only from and between the round corners 4—4 of the triangular opening before member A comes into rotatable sliding contact with bar B. The swinging movement of member A may continue of course, but the limit of rocking movement has been reached when the bar comes into rotatable contact with the round corners 4 of member A. A rocking movement of member A within the straight edge limits as shown is sufficient for normal usage of a hammock or swing seat, and the rounded corners 4—4 are provided to permit a complete rotatable movement of member A if occasion demands or to permit a greater degree of swinging movement to take place without causing disconnection and separability of the parts, say as might occur in rough play of children or high swinging of the hammock, or a play-ground swing.

As shown in Figs. 1 and 2, plate A tapers to a narrower width at its lower end which is perforated or provided with an opening 5 located exactly on the longitudinal median line of this elongated member to permit attachment of a chain 6 or other flexible connector thereto. I may use a hook extremity in lieu of the perforated extremity shown. For example in Fig. 3 I show an S-shaped hook member A' made of round stock, the lower bent end 7 forming an open hook for chain 6, and the upper reversely bent end 8 having a straight horizontal part 9 adapted to provide a straight rocking edge terminating in round corners 10—10 to correspond with the straight edge 2 and round corners 4—4 of member A of Fig. 1. A supporting member C made of round stock, such as a screw eye or hook, may be used with hook member A' to obtain the desired rocking results hereinbefore described.

In Figs. 4 and 5, I show an open link A", but which may be of the closed type if desired, the upper end being widened and formed with a straight horizontal part 11 terminating in rounded corners 12—12 to permit this link to function as described, the straight part rocking on a rounded supporting part such as a hook or eye member C as shown.

What I claim is:

1. A coupling member or link for hammocks, swings and the like, having one end thereof formed with a straight bearing portion extending at right angles to the longitudinal median line of said link and terminating in downwardly-extended rounded portions, which are spaced so as to limit the rocking movements of the link equal distances on opposite sides of the said median line, and the opposite end of said link being constructed to suspend a connecting part therefrom on the same median line.

2. The combination of a convexly rounded supporting member with a link having a relatively short straight bearing portion extending at right angles to the median line of the link and to equal distances in opposite directions therefrom adapted to rock upon said rounded supporting member and stop portions adapted at opposite ends of said straight portion to limit the rocking movement of said link upon said member, the lower end of said link being constructed to suspend a swinging part therefrom on the median line and centrally in respect to said stop portion.

3. In a hammock or swing, a supporting member having a convexly rounded surface, a link having a straight rocker portion resting upon said rounded surface and free to rock in a plane at right angles thereto, and a suspensory connection for the hammock or swing attached to the lower end of said link on a median line extending centrally through said straight rocker portion.

4. A coupling member or link for hammocks, swings, and the like, comprising a depending portion having an opening on the longitudinal median line of the member and provided at its upper end with a straight bearing portion adapted to rock on a round surface, said straight portion extending equal distances to opposite sides of said longitudinal median line and terminating in round corners adapted to limit the rocking movements of said member to an angle of forty-five degrees at opposite sides of said longitudinal median line and to permit rotatable movement within said round corners beyond said rocking limits.

In testimony whereof I affix my signature.

TOD S. EDEBURN.